United States Patent
Stork et al.

(10) Patent No.: US 12,510,871 B2
(45) Date of Patent: Dec. 30, 2025

(54) AUTOMATION SYSTEM

(71) Applicant: Lenze SE, Aerzen (DE)

(72) Inventors: Detlef Stork, Minden (DE); Elmar Hartmann, Aerzen (DE); Matthias Boese, Aerzen (DE)

(73) Assignee: Lenze SE, Aerzen (DE)

( * ) Notice: Subject to any disclaimer, the term of this patent is extended or adjusted under 35 U.S.C. 154(b) by 391 days.

(21) Appl. No.: 18/087,275

(22) Filed: Dec. 22, 2022

(65) Prior Publication Data
US 2023/0251613 A1    Aug. 10, 2023

(30) Foreign Application Priority Data
Dec. 23, 2021    (DE) .................... 10 2021 215 009.8

(51) Int. Cl.
*G05B 19/04* (2006.01)
*G05B 19/05* (2006.01)

(52) U.S. Cl.
CPC ......... *G05B 19/041* (2013.01); *G05B 19/058* (2013.01)

(58) Field of Classification Search
CPC ................ G05B 19/041; G05B 19/058; G05B 19/0426; H02M 7/537; H02M 1/32; H04L 41/06; H04L 43/0817
See application file for complete search history.

(56) References Cited

U.S. PATENT DOCUMENTS

| | | | |
|---|---|---|---|
| 7,058,712 B1* | 6/2006 | Vasko .................... | H04L 41/12 700/20 |
| 7,233,830 B1* | 6/2007 | Callaghan .......... | G05B 19/4188 700/20 |
| 2015/0134733 A1* | 5/2015 | Maturana ................ | H04L 67/12 709/203 |
| 2016/0274552 A1* | 9/2016 | Strohmenger ......... | G06Q 10/06 |
| 2018/0027071 A1 | 1/2018 | Toepke et al. | |

FOREIGN PATENT DOCUMENTS

| | | |
|---|---|---|
| DE | 197 41 959 C2 | 3/2000 |
| DE | 10 2017 116 706 A1 | 1/2018 |
| DE | 10 2019 217 047 A1 | 5/2021 |
| EP | 3 276 437 A1 | 1/2018 |

* cited by examiner

*Primary Examiner* — Christopher W Carter
(74) *Attorney, Agent, or Firm* — Crowell & Moring LLP

(57) ABSTRACT

An automation system includes function-providing components which offer functions, function-using components which access the functions, and at least one intermediary component. The function-providing components are configured to register with the intermediary component. The function-using components are configured to register with the intermediary component. When the function-using components require access to a specific function, they request from the at least one intermediary component a function-providing component that offers the specific function, wherein, if such a function-providing component is registered with the at least one intermediary component, the at least one intermediary component enables access to the specific function for the function-using component.

5 Claims, 1 Drawing Sheet

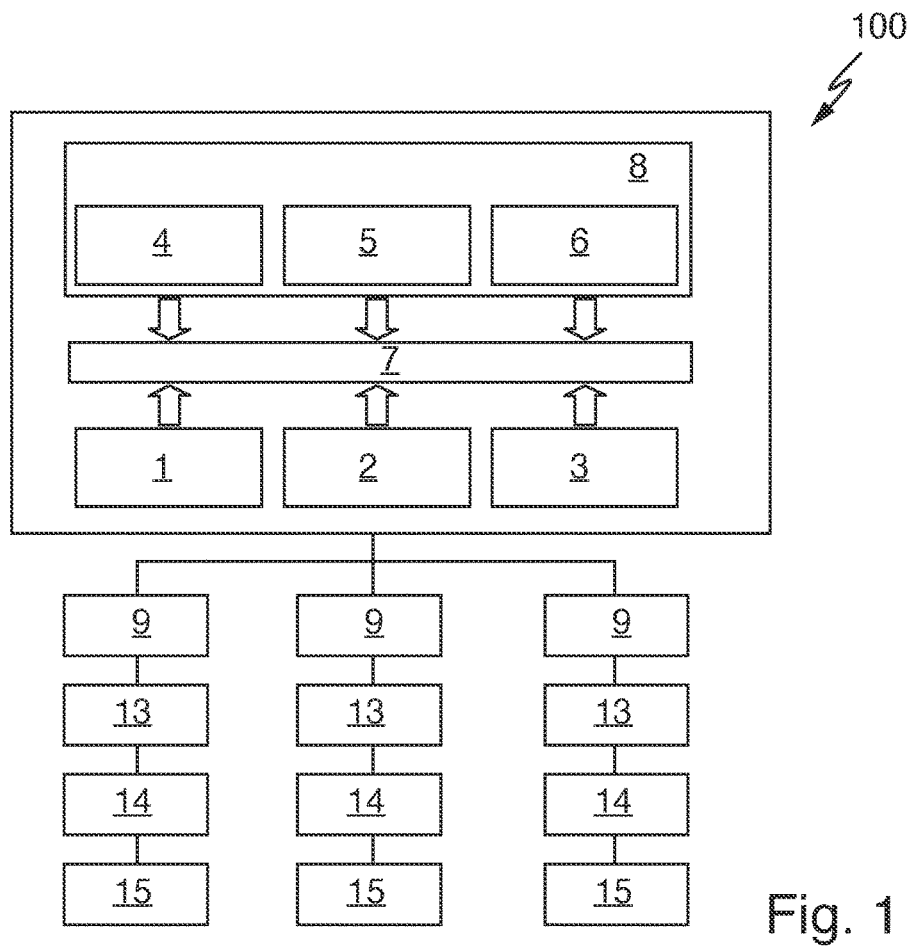
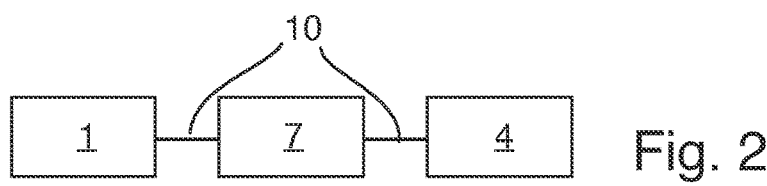
Fig. 2
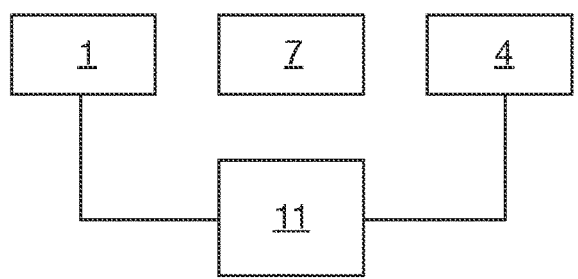
Fig. 3
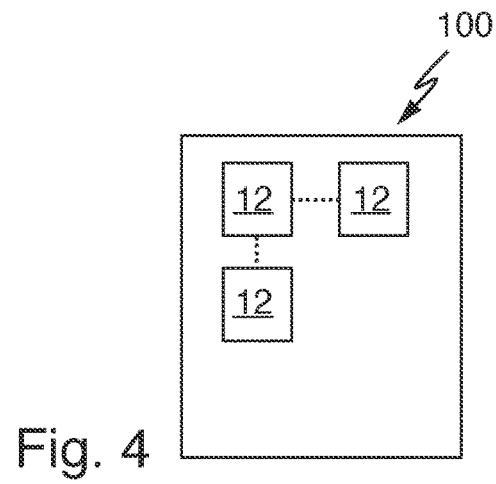
Fig. 4

AUTOMATION SYSTEM

BACKGROUND AND SUMMARY

The invention relates to an automation system which can be operated as flexibly as possible.

The automation system has one or more function-providing components, which offer or provide specific functions.

The automation system further has function-using components, which access the functions.

The automation system further has one or more intermediary components. The function-providing and/or the function-using components register with the intermediary component.

If a function-using component requires access to a specific function, the function-using component requests from the intermediary component a function-providing component that offers the specific function. If such a function-providing component is registered with the intermediary component, the intermediary component enables access to the specific function for the function-using component, for example by establishing a communication channel between the two components. If no such function-providing component is registered with the intermediary component, this is communicated to the function-using component and/or an error message is generated.

In one embodiment, a first type of function-providing components offers functions for error management of the automation system, and/or a second type of function-providing components offers functions for license management of the automation system, and/or a third type of function-providing components offers functions for detecting a state of the automation system.

In one embodiment, a first type of function-using components are components of a programmable logic controller, and/or a second type of function-using components are components of a frequency converter.

In one embodiment, the function-providing components, the function-using components and/or the intermediary component are connected together for data exchange by means of a fieldbus and/or a shared memory.

In one embodiment, the intermediary component is configured to activate a function-providing component only as soon as a function-using component requires access to the specific function of the function-providing component, and/or the intermediary component is configured to deactivate a function-providing component as soon as access to the specific function of the function-providing component is no longer required by any function-using component.

In one embodiment, the automation system has a plurality of microprocessor systems, wherein the function-providing components, the function-using components and the intermediary component are implemented on at least one of the microprocessor systems, wherein the intermediary component is configured to select a microprocessor system, on which the function-providing components and/or the function-using components are implemented, on the basis of predefinable criteria.

In one embodiment, the predefinable criteria are selected from: utilization of the plurality of microprocessor systems as equally as possible, highest possible processing capacity, and lowest possible energy consumption.

The intermediary component coordinates, manages and distributes data and/or information. The intermediary component ensures that the function-providing and function-using components know about one another and ultimately are able to exchange data. The intermediary component here functions like a conductor of an orchestra.

According to the invention, a distinction is made in principle between function-providing components, i.e. service providers, and function-using components, i.e. service users. The intermediary component carries out the registration of the function-providing components and of the function-using components and initiates communication between the components. The intermediary component thus ensures that the components are able to exchange data with one another. The useful data then preferably flow between the components directly.

The intermediary component offers, for example, functions or interfaces which the function-providing and function-using components access, for example a function for establishing a connection and a function for registering as a function provider or function user. The resulting information can then be kept in a shared memory structure, for example. Further function-providing components and function-using components can be assigned to the shared memory structure at any time, for example during the runtime of the automation system. When a programmable logic controller is started, the processes or components thereof can be registered with the intermediary component, for example. The shared memory structure is thus supplemented with the information that the process or component is present, and the required function-providing or function-using components are additionally also registered. If a process or a function-using component then requests a function-providing component that is not present or that has not been registered, an error would be generated.

When a plurality of intermediary components are used, a connection between function-providing components and function-using components can also be established across system boundaries or levels in shared automation systems. Information transfer then also takes place between the different intermediary components which are arranged in each subsystem. For example, only a single function-providing component for license management of the automation system may be present in a subsystem, wherein function-using components from other subsystems obtain access to this function-providing component for license management in that their request to the intermediary component of their subsystem is transmitted to the other subsystem containing the function-providing component.

The intermediary component can also provide or generate information about a structure of the components. In this respect, the intermediary component identifies not only each function-providing or function-using component, but also their relationships with one another. This is helpful specifically in the case of complex automation systems for service and diagnosis. Hardware and software components can thus be represented. Because these components act with one another in different contexts, it is important to present these hierarchies in different representations. For example, a frequency converter which is connected by way of a fieldbus and installed in a machine module can be represented in a functional view as an actuator of the machine module. From a communication point of view, the frequency converter is a specific fieldbus participant with a specific address. From another point of view, the frequency converter is a component that is connected to a motor. The intermediary component knows all these dependencies and relationships and can transmit them, for example, to a display.

The invention will be described in detail below with reference to the drawings.

BRIEF DESCRIPTION OF THE DRAWINGS

FIG. 1 is a block diagram of an automation system according to an embodiment of the invention having function-providing components, function-using components and an intermediary component which functionally couples the function-providing components with the function-using components;

FIG. 2 is a block diagram of a variant of the automation system shown in FIG. 1, in which the components are coupled with one another for data exchange by means of a fieldbus;

FIG. 3 is a block diagram of a further variant of the automation system shown in FIG. 1, in which the components are coupled with one another for data exchange by means of a shared memory; and FIG. 4 is a block diagram of a further variant of the automation system shown in FIG. 1 having a plurality of microprocessor systems.

DETAILED DESCRIPTION OF THE DRAWINGS

FIG. 1 shows, in highly schematic form, an automation system 100 having: function-providing components 1, 2, 3, which offer specific functions required in the automation system 100, function-using components 4, 5, 6, which access the functions, and an intermediary component 7.

The function-providing components 1, 2, 3 are each configured to register with the intermediary component 7. In a corresponding manner, the function-using components 4, 5, 6 are configured likewise to register with the intermediary component 7.

If the function-using components 4, 5, 6 require access to a specific function, they request from the intermediary component 7 a function-providing component 1, 2, 3 that offers the specific function. If such a function-providing component 1, 2, 3 is registered with the at least one intermediary component 7, the intermediary component 7 enables access to the specific function for the function-using component 4, 5, 6.

By way of example, a first type of function-providing components 1 offers functions for error management of the automation system. A second type of function-providing components 2 offers functions for license management of the automation system 100. A third type of function-providing components 3 offers functions for detecting a state of the automation system 100.

The function-using components 4, 5, 6 are in the present case each components of a programmable logic controller 8. Alternatively or in addition, function-using components can also be, for example, components of frequency converters 9 of the automation system 100.

The function-providing components 1, 2, 3, the function-using components 4, 5, 6 and/or the intermediary component 7 can be connected for data exchange by means of a fieldbus 10, as shown in FIG. 2. Alternatively or in addition, the function-providing components 1, 2, 3, the function-using components 4, 5, 6 and/or the intermediary component 7 can be connected for data exchange by means of a shared memory 11, as shown in FIG. 3.

The intermediary component 7 is configured to activate a function-providing component 1, 2, 3 only as soon as a function-using component 4, 5, 6 requires access to the specific function of the function-providing component 1, 2, 3. The intermediary component 7 is further configured to deactivate a function-providing component 1, 2, 3 as soon as access to the specific function of the function-providing component 1, 2, 3 is no longer required by any function-using component 4, 5, 6.

Referring to FIG. 4, the automation system 100 can have a plurality of microprocessor systems 12, wherein the function-providing components 1, 2, 3, the function-using components 4, 5, 6 and the at least one intermediary component 7 are implemented on at least one of the microprocessor systems 12, wherein the intermediary component 7 is configured to select a microprocessor system 12, on which the function-providing components 1, 2, 3 and/or the function-using components 4, 5, 6 are implemented, on the basis of predefinable criteria. The predefinable criteria can be, for example: utilization of the plurality of microprocessor systems as equally as possible, highest possible processing capacity, or lowest possible energy consumption.

Referring again to FIG. 1, the automation system 100 further has a first machine element in the form of an exemplary infeed conveyor (left-hand column) having a frequency converter 9, an electric motor 13 activated by means of the frequency converter 9, a transmission 14 activated by means of the electric motor 13, and a mechanism 15 activated by means of the transmission 14.

The automation system 100 further has a second machine element in the form of an exemplary processing system (middle column) having a frequency converter 9, an electric motor 13 activated by means of the frequency converter 9, a transmission 14 activated by means of the electric motor 13, and a mechanism 15 activated by means of the transmission 14.

The automation system 100 further has a third machine element in the form of an exemplary outfeed conveyor (right-hand column) having a frequency converter 9, an electric motor 13 activated by means of the frequency converter 9, a transmission 14 activated by means of the electric motor 13, and a mechanism 15 activated by means of the transmission 14.

Each of these machine elements has the following core elements: mechanism, for example in the form of conveyor belts, saws, drills and adhesive-bonding devices; actuators for the mechanism, for example in the form of transmissions, motors; stimulators of the actuators, for example in the form of frequency converters and IO modules; and control software for machine technologies.

The operation of the automation system 100 shown in FIG. 1 will be described hereinbelow.

In a first step, all the electrical components of the automation system 100 are switched on.

Then, in a second step, the function-providing components 1, 2, 3 register with the intermediary component 7 and make their functions available to the automation system 100. The functions include error management, which provides handling of all hardware and software errors in the automation system 100, functions for license management of the automation system 100, i.e. the provision of all the relevant data for time-optimized system analysis and maintenance, and functions for detecting a state of the automation system 100, i.e. the provision of relevant data for system efficiency monitoring and system process improvement.

Then the actual system controller of the programmable logic controller 8 is started.

Then the function-using components 4, 5, 6 register with the intermediary component 7 and inform the intermediary component 7 which universal machine functions they use and with which data they are to be supplied.

Actuators in a switch cabinet, such as, for example, the frequency converters 9, have a digital interface and supply data to the automation system 100 and thus to the universal system functions directly.

For actuators that do not have a digital interface, such as, for example, the motors 13, the transmissions 14 and the mechanical elements 15, digital images are generated automatically and the data therefor are stored in the intermediary component 7, which can likewise take place in the course of a registration process with the intermediary component 7. The data of the hardware elements 13 to 15 can, for example, be generated by CAD software and stored in the automation system 100. A registration process for components at the fieldbus 10 and for associated processes can take place directly by way of the intermediary component 7.

Data handling during the system runtime is carried out as follows.

Owing to the registration of the function-providing component 1 for error management with the intermediary component 7, any function-using component is able to transmit errors and messages easily and in a standardized manner. Any message can thus be unambiguously attributed to a component, whether it be hardware or software. Tracking systems, such as displays locally or in remote systems, can clearly display the errors.

After the function-providing component 2 for license management has offered its function by registration with the intermediary component 7, the intermediary component 7 communicates this to the other components, which can now supply data. The function-providing component 2 for license management can have its own database for this purpose, which it fills with data directly from the hardware and software elements. If the function-providing component 2 for license management then receives request internally or externally, it transmits the data to the requesting component by way of a standardized OPC UA interface, for example. The automation system 100 is thus capable of providing status and location information about all its components.

A plurality of intermediary components may also be connected in a cross-system or cross-device manner in order to use the invention in shared systems. An intermediary component in a first subsystem can, for example, ensure that a request of a service-using component is not processed in its own subsystem, but that a function-providing component in a different subsystem is used. The intermediary components then ensure that the data of the function-using component are transmitted across the system boundaries to the correct function-providing component.

New function-providing or function-using components added later can also be made known to the automation system 100 during its runtime. That is to say, the intermediary component is configured to register and make usable new components during the runtime.

A key feature of the intermediary component is that it controls the function-providing components in a resource-efficient manner. A function-providing component is activated or implemented only if at least one function-using component registers a requirement. If the function-providing component is no longer being addressed by any component, it is deactivated again. This saves memory requirement and processor runtime.

For activating a component, an associated program code in the form of a so-called shared object can first be loaded into the main memory of a microprocessor system, for example. An initialization function of the component is then called up, whereupon the component itself then optionally utilizes further resources of the microprocessor system.

If required, the intermediary component can carry out load balancing, in that function-providing services are off-loaded to other target systems in order, for example, to ensure the real-time capability of a system.

The invention claimed is:

1. An automation system, comprising:
microprocessor-implemented function-providing components, which offer functions;
microprocessor-implemented function-using components, which access the functions; and
at least one microprocessor-implemented intermediary component,
wherein the function-providing components are configured to register with the intermediary component and make their functions available to the automation system,
wherein the function-using components are configured to register with the intermediary component, and
wherein, when the function-using components require access to a specific function, the function-using components request from the at least one intermediary component a function-providing component that offers the specific function, wherein:
when such a function-providing component is registered with the at least one intermediary component, the at least one intermediary component enables access to the specific function so as to be used by the function-using component, and
when no such function-providing component is registered with the intermediary component, the intermediary component communicates to the function-using component that no such function-providing component is registered and/or the intermediary component generates an error message,
wherein at least one of:
a first type of function-providing components offers functions for error management of the automation system, or
a second type of function-providing components offers functions for license management of the automation system, or
a third type of function-providing components offers functions for detecting a state of the automation system, or
a first type of function-using components are components of a programmable logic controller, or
a second type of function-using components are components of a frequency converter,
wherein
the intermediary component is configured to activate a function-providing component only as soon as a function-using component requires access to the specific function of the function-providing component, and/or the intermediary component is configured to deactivate a function-providing component as soon as access to the specific function of the function-providing component is no longer required by any function-using component.

2. The automation system according to claim 1, wherein the function-providing components, the function-using components and/or the intermediary component are connected for data exchange via a fieldbus.

3. The automation system according to claim 1, wherein the function-providing components, the function-using components and/or the intermediary component are connected for data exchange via a shared memory.

4. The automation system according to claim 1, wherein the automation system has a plurality of microprocessor systems, wherein the function-providing components, the function-using components and the at least one intermediary component are implemented on at least one of the microprocessor systems, wherein the intermediary component is configured to select a microprocessor system, on which the function-providing components and/or the function-using components are implemented, based on predefinable criteria.

5. The automation system according to claim 4, wherein the predefinable criteria are selected from:
utilization of the plurality of microprocessor systems as equally as possible, highest possible processing capacity, and
lowest possible energy consumption.

* * * * *